(12) United States Patent
Woo

(10) Patent No.: US 7,437,138 B1
(45) Date of Patent: Oct. 14, 2008

(54) ALL CMOS GPS RECEIVER WITH NOISE-MATCHED HIGH IMPEDANCE ON-CHIP ANTENNA

(75) Inventor: Arthur N. Woo, Cupertino, CA (US)

(73) Assignee: Eride, Inc., San Francisco, CA (US)

( * ) Notice: Subject to any disclaimer, the term of this patent is extended or adjusted under 35 U.S.C. 154(b) by 478 days.

(21) Appl. No.: 11/217,927

(22) Filed: Sep. 1, 2005

(51) Int. Cl.
H04B 1/28 (2006.01)
H04Q 7/20 (2006.01)

(52) U.S. Cl. ............... 455/333; 455/280; 342/357.06

(58) Field of Classification Search ............... 455/333, 455/280–282; 343/700 MS; 342/357.06
See application file for complete search history.

(56) References Cited

U.S. PATENT DOCUMENTS

| | | | | |
|---|---|---|---|---|
| 7,088,964 | B2 * | 8/2006 | O | 455/90.3 |
| 7,235,880 | B2 * | 6/2007 | Prokofiev | 257/734 |
| 2002/0196181 | A1 * | 12/2002 | Fall | 342/357.06 |

OTHER PUBLICATIONS

EECS 522 Analog Integrated Circuits Project, Winter 2002; "A 1.9 GHz Low Noise Amplifier", by Jerome Le Ny, Bhavana Thudi and Jonathan McKenna.

Thesis: "An Investigation of On-Chip Antenna Characteristics Related to Energy Harvesting Applications" by Dmitry Gorodetsky, University of Pittsburgh, 1999.

Optotek,Ltd. (Ottawa, Ontario, Canada) Application Note 34, "Amplifier Load Mismatch Design Using MMICAD" by D. Fitzpatrick.

CommsDesign Article Wireless Transceiver-on-Chip Now Possible, by R. Colin Johnson, Aug. 3, 2004.

* cited by examiner

*Primary Examiner*—Lee Nguyen
(74) *Attorney, Agent, or Firm*—Thomas E. Schatzel; Law Offices of Thomas E. Schatzel A Prof. Corp.

(57) ABSTRACT

A GPS receiver depends on CMOS technology for both its GPS digital signal processing (DSP) and radio frequency (RF) stages. A resulting increase in RF input noise generated by the CMOS RF input is overcome by placing the antenna on-chip or on a lid of an application specific integrated circuit (ASIC) that includes the DSP and RF stages, and matching it for the best noise figure rather than the best impedance match. The on-chip antenna is matched to the natural high impedance of the CMOS RF input without requiring matching networks that can attenuate already weak signals. Using CMOS technology for both the GPS DSP and RF stages eliminates the need for level shifts between what would otherwise be a 3-volt RF section and a 1.2-volt DSP section.

11 Claims, 3 Drawing Sheets

ALL CMOS GPS RECEIVER WITH NOISE-MATCHED HIGH IMPEDANCE ON-CHIP ANTENNA

FIELD OF THE INVENTION

The present invention relates to all-CMOS navigation satellite receivers, and more particularly to methods and systems for eliminating level-shifters in order to conserve operating power, and to methods and systems for matching on-chip antennas for the best noise figure rather than the best impedance match.

DESCRIPTION OF THE PRIOR ART

The increasing circuit densities and concomitant decreases in semiconductor feature geometries have been driving down the operating voltages needed by the devices. Current CMOS technology implementations are now using one-volt operating voltages. In the past, TTL logic had standardized on 5-volt logic. So when different technologies are intermixed in a single product design, some form of logic level shifting is needed. Such level-shifters consume a relatively large amount of power, and their elimination can increase battery life in portable devices.

Gallium arsenide (GaAs) technology has been traditionally used in radio frequency circuitry because of its good high frequency response and low noise operation. But GaAs semiconductor devices operate at higher powers than equivalent CMOS semiconductor devices, and no longer have much of an advantage over CMOS in terms of high frequency operation. But CMOS is inherently more noisy, and sensitive applications like GPS-antenna low noise amplifiers (LNA) are especially challenging. GPS receivers already work with very low receiver signal levels, and just a little bit more noise can seriously degrade performance.

Various standardized antenna and transmission line impedances have become standardized and ubiquitous over the years. For example, broadcast television antennas were originally designed with 300-ohm terminal impedances that were coupled to the TV set with 300-ohm twinlead wire. Later designed switch to 75-ohm coax cable for its better immunity to electrical noise, and 300-to-75 ohm baluns were used at the antenna to match the impedance of the antenna to the transmission line impedance. Such matching networks had losses, but these losses were acceptable. Radio communication systems have almost universally adopted 50-ohm impedance antennas and coaxial cables. These too have used matching networks for both the transmitter match and the receiver input match.

The prior art generally assumes that the best antenna and receiver performance will be realized when the antenna, transmission line, and input impedances are all matched to be the same. Common practice means each will be 50-ohm impedances. It can be proven that maximum power transfer from the input to the output occurs when the impedances are so matched. But here the present invention depends on some other impedance match being the best for minimum noise figure at the RF input. The traditional 50-ohm impedance is arbitrary, and not controlling in an on-chip antenna design. The best noise figure must be accomplished in an all CMOS design where the input amplifier is a MOS transistor.

SUMMARY OF THE INVENTION

Briefly, a GPS receiver embodiment of the present invention depends on CMOS technology for both the GPS digital signal processing (DSP) and radio frequency (RF) stages. A resulting increase in RF input noise generated by the CMOS RF input is overcome by placing the antenna on-chip or on the lid of an ASIC package, and matching it for the best noise figure rather than the best impedance match. The on-chip antenna is matched to the natural high impedance of the CMOS RF input without requiring matching networks that can attenuate already weak signals. Using CMOS technology for both the GPS DSP and RF stages eliminates the need for level shifts between what would otherwise be a 3-volt RF section and a 1.2-volt DSP section.

An advantage of the present invention is that a GPS receiver and method are provided that requires reduced battery power and can therefore operate for longer periods.

Another advantage of the present invention is that a GPS receiver and method are provided that make a single-chip implementation and the concomitant savings possible.

These and other objects and advantages of the present invention will no doubt become obvious to those of ordinary skill in the art after having read the following detailed description of the preferred embodiments which are illustrated in the various drawing figures.

IN THE DRAWINGS

Figure 3:
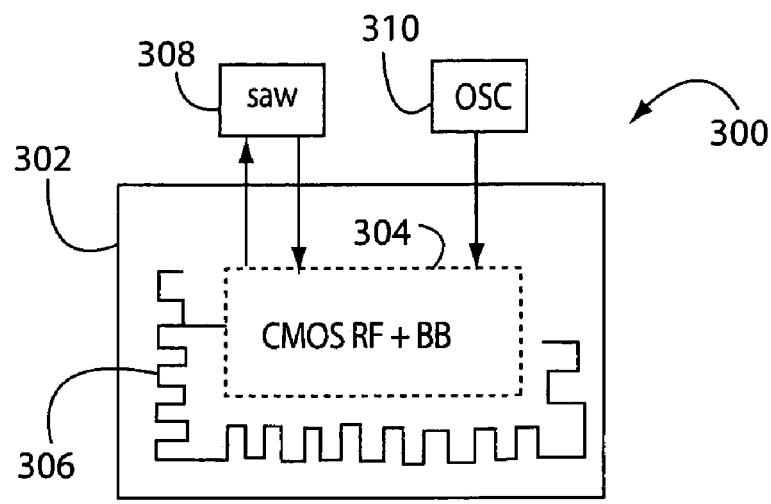
Figure 4:
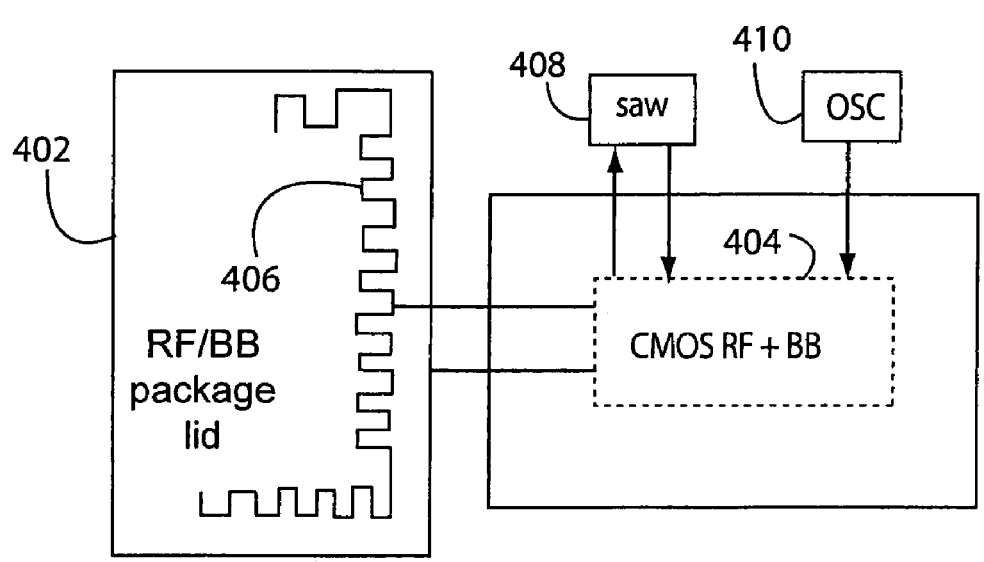

FIG. 3 is a schematic diagram of a GPS receiver embodiment of the present invention and represents the physical placement of a meander antenna on-chip and peripheral to a CMOS RF-baseband core disposed in a semiconductor chip; and FIG. 4 is a schematic diagram of a GPS receiver embodiment of the present invention and represents the physical placement of a meander antenna placed on the lid of an ASIC package and peripheral to a CMOS RF-baseband core disposed in a semiconductor chip.

DETAILED DESCRIPTION OF THE PREFERRED EMBODIMENT

Figure 1A:
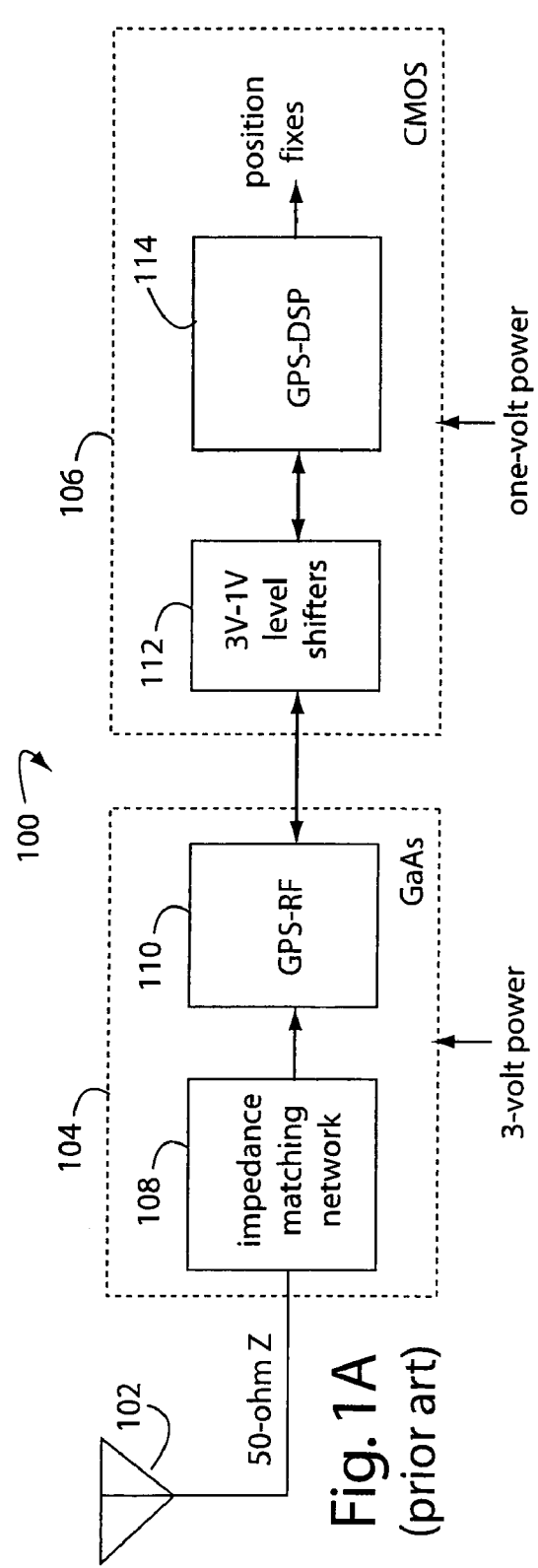
FIG. 1A is a functional block diagram of a conventional GPS receiver that mixes GaAs and CMOS semiconductor technologies.

FIG. 1A illustrates a prior art GPS receiver, and is referred to herein by the general reference 100. The GPS receiver includes a 50-ohm microwave patch antenna 102 connected to a gallium-arsenide (GaAs) technology radio frequency (RF) stage 104. Digital samples of the downconverted GPS satellite transmissions are provided to a GPS digital signal processor (DSP) 106. The 50-ohm antenna 102 is typically connected with a 50-ohm transmission cable to an impedance matching network 108. Such provides the best impedance matching so maximum signal power is transferred. But the best impedance match may not represent the best signal injection noise figure.

The RF stage 104 includes a conventional GPS-RF receiver 110 that uses GaAs technology and therefore requires a three-volt power supply. It outputs three-volt logic that must be level-shifted down to one-volt by level shifters 112. The level shifting is implemented in the CMOS device 106. A GPS navigation computer 114 produces position solutions from the samples shifted by shifters 112. But such level shifting consumes a significant amount of power relative to the GPS navigation computer 114. So their elimination can represent a substantial power savings and offer extended battery life during portable operation.

Figure 1B:
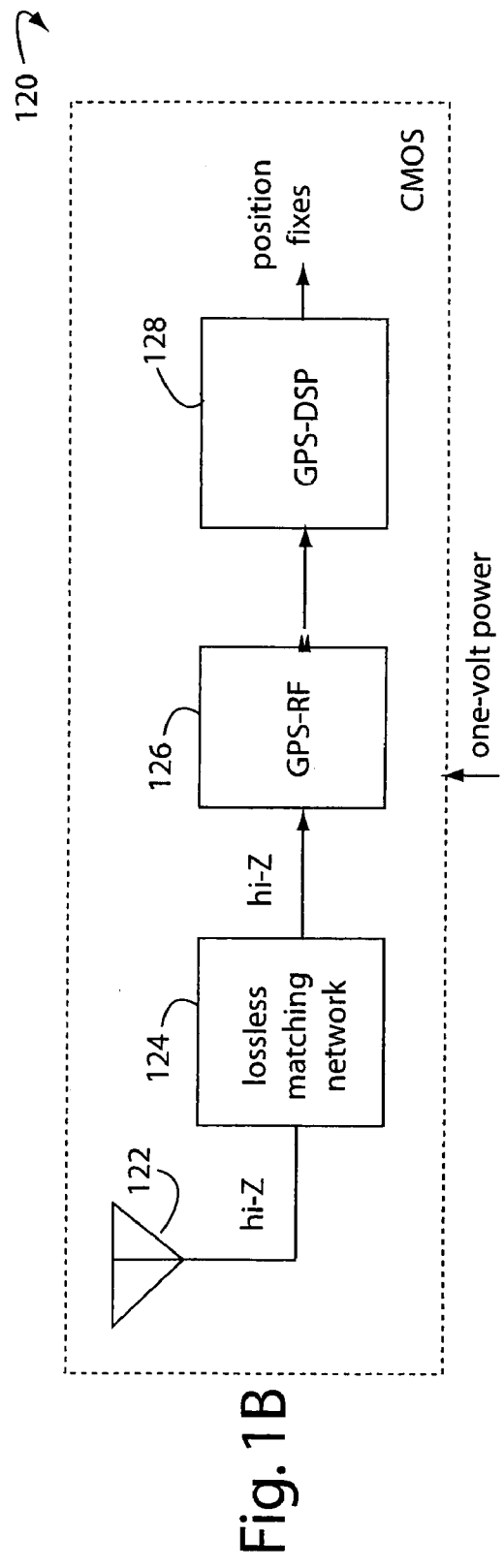
FIG. 1B is a functional block diagram of a GPS receiver embodiment of the present invention that uses only CMOS technology.

Now compare the prior art of FIG. 1A to the present invention represented in FIG. 1B. FIG. 1B illustrates a GPS receiver embodiment of the present invention, and is referred to herein by the general reference numeral 120. The GPS receiver 120 comprises a meander-line on-chip antenna 122 to receive the microwave transmissions of orbiting GPS satellites. The antenna is a high-impedance, on-chip design that is matched for the best noise-figure. This is represented by a lossless matching network 124 which provides a modest amount of signal gain. A GPS radio frequency (RF) 126 and baseband digital signal processor (DSP) 128 tune and demodulate GPS satellite signals. Such baseband digital signal processor (DSP) 128 has been marketed separately by e-Ride (San Francisco, Calif.) under its trademark OPUS. The input to RF 126 will typically be a high-impedance input of a low-noise amplifier (LNA) stage.

Maintaining a traditional 50-ohm impedance scheme when the antenna and connections are fully integrated on the semiconductor device is arbitrary and can lead to increased noise levels in this application. The higher input impedances may be achieved by using parallel-resonance points in the antenna rather than the more traditional series-resonant points. The feed-point at which an antenna is tapped will also effect the impedance.

Figure 2:
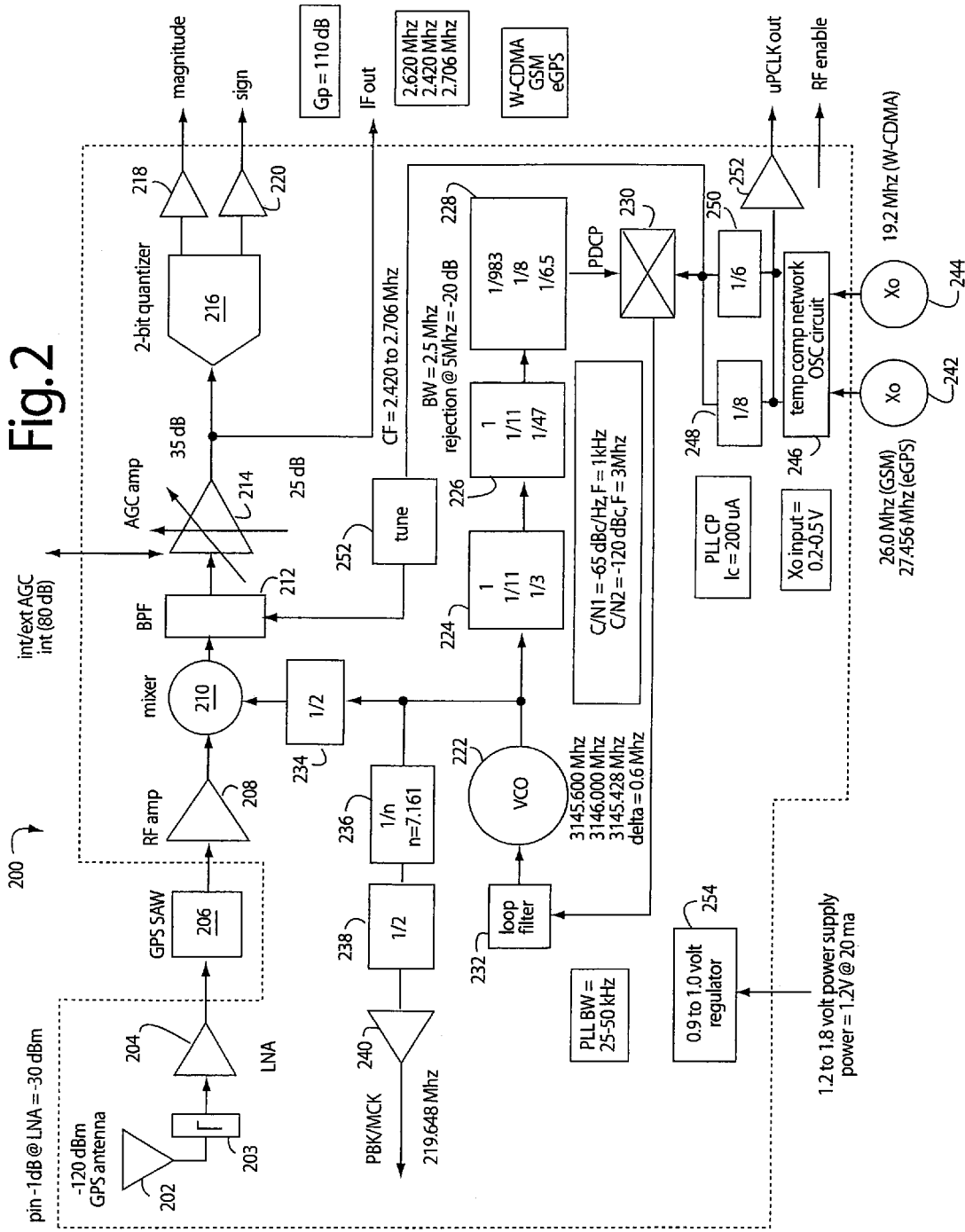
FIG. 2 is a functional block diagram of an implementation of the GPS-RF part of the receiver of FIG. 1B.

FIG. 2 represents a GPS RF chip embodiment of the present invention, and is referred to herein by the general reference numeral 200. The GPS RF-DSP chip 200 comprises an on-chip antenna 202 with a high output impedance tap and lossless matching network 203 that matches to the high input impedance of a CMOS technology low noise amplifier (LNA) 204. An arbitrary 50-ohm impedance is not used because a matching network that generates noise would be needed between the antenna 202 and LNA 204. In fact, the match between antenna 202 and LNA 204 is not adjusted for best impedance match, and therefore maximum power transfer, but rather best noise-figure. An RF bandpass filter (GPS-SAW) 206 precedes an RF amplifier 208. An intermediate frequency (IF) is generated by a mixer 210 that receives a synthesized local oscillator (LO) frequency. A tunable IF filter (BPF) 212 removes the mixer images. The downconverted baseband is amplified by an automatic gain control (AGC) stage 214. A 2-bit quantizer 216 produces magnitude and sign digital samples that are output by buffers 218 and 220.

A voltage controlled oscillator 222 is used in a phase locked loop (PLL) to synthesize a variety of operating frequencies. Different frequency plans are implemented by programmable dividers 224, 226, and 228. A phase detector 230 compares the final division to a crystal generated reference frequency. A feedback difference control signal is returned through a loop filter 232 to keep VCO 222 on frequency. A divider 234 provides a final LO frequency to mixer 210. Master (MCK) and other (PBK) clocks are derived from the VCO 222 by dividers 236 and 238, and output buffer 240. A first crystal oscillator (Xo) 242 and a second crystal oscillator (Xo) 244 are hardware temperature-compensated by a network 246. Such corresponds to temperature curve flattening circuit 110 in FIG. 1. Selectable dividers 248 and 250 provide a choice in crystal reference frequency. Such is used by tuner 252 to operate BPF 212. A voltage regulator 254 provides for the correct rail voltage for a CMOS chip with sub-0.20 micrometer geometry, e.g., about one volt. The all-CMOS design allows both the RF and DSP sections to be implemented on the same semiconductor chip.

Embodiments of the present invention use an on-chip antenna tapped at a high-impedance point that produces optimum noise figure at the RF input. The input impedance of a MOSFET is inherently capacitive, so providing a good impedance match to a 50-ohm resistance without degrading noise performance would appear to be difficult. See, EECS 522 ANALOG INTEGRATED CIRCUITS PROJECT, WINTER 2002; "A 1.9 GHz Low Noise Amplifier", authored by Jerome Le Ny, Bhavana Thudi, Jonathan McKenna. Simply putting a 50-ohm resistor across the input terminals of a common source amplifier injects thermal noise and attenuates the signal ahead of the transistor. Such results in unacceptably high noise figures. A common-gate configuration can be used where the input impedance looking into the source terminal is 1/gm. A critical balance of device size and bias current can provide the desired match. But, the noise figure for high frequency operation would be excessive due to transistor gate current noise. A third configuration uses a resistor shunt and series feedback to fix the input and output impedances of the LNA. But this has relatively higher power dissipation compared to others with similar noise performance. Shunt-series amplifiers are naturally broadband, and LC tuning techniques to reduce power consumption cannot be used. It also needs quality on-chip resistors which are generally not available in CMOS technologies. An inductive source degeneration method may be the best. With a series input inductance (Ls), a real term in the input impedance can be generated without using resistors that can degrade noise performance. Tuning the amplifier input becomes necessary, which can be a favorable narrow band approach for a GPS application. The input impedance is that of a series RLC network, with a resistive term that is directly proportional to the inductance value. At series resonance, the input circuit impedance is purely real and proportional to Ls. By choosing Ls appropriately, the best noise match can be obtained. A gate inductance Lg is set by the resonance frequency once the Ls is chosen to satisfy the necessary input impedance.

See, Thesis: "AN INVESTIGATION OF ON-CHIP ANTENNA CHARACTERISTICS RELATED TO ENERGY HARVESTING APPLICATIONS", by Dmitry Gorodetsky, B.Sc. in Electrical Engineering, University of Pittsburgh, 1999. The antenna input impedance, $Z_A$, usually refers to the impedance seen looking into the terminals of the antenna. This is different from $Z_{IN}$, because $Z_{IN}=Z_A+Z_{FEED}$. The antenna impedance has a real and an imaginary component and is given by: $Z_A(f)=R_A(f)+jX_A(f)$. The input resistance, which is the real part of the antenna input impedance, will usually consist of two components, $R_L$, the loss resistance of the antenna and $R_r$, the radiation resistance of the antenna. These two components appear in series.

Ignoring the consequences to achieving an optimum noise figure, the maximum power transfer theorem states that in order to obtain maximum power from an antenna, its input impedance ($Z_{IN}$) must be a conjugate of the load's impedance. When this is achieved, half of the power will be absorbed in the antenna and half will be utilized in the load. After the maximum power transfer theorem has been satisfied, the next step is to limit the power losses within the antenna. This can be done by minimizing $R_L$ and maximizing $R_r$. In other words, this is an adjustment of the efficiency of the antenna. If the characteristic impedance and the antenna input impedance are equal, the input impedance is real and simply seen is $Z_0$. In this case, the length of the feed becomes irrelevant to the impedance seen at its 13 terminals. This is the condition of perfect matching of the load to the line. When this occurs, all power is absorbed by the load and there is no reflection. Usually in RF work the transmission lines are designed so that their characteristic impedance is real at the specified frequency. The value of the characteristic impedance is typically 50-ohms or 75-ohms. Such enables the connection of multiple units using standard coaxial cables.

Optotek Ltd. (Ottawa, Ontario, Canada) Application Note 34, "Amplifier Load Mismatch Design Using MMICAD", by D. Fitzpatrick (http://www.optotek.com/pdfs/note34.pdf) describes a method for matching circuits to achieve an optimum noise figure. According to a an article published by Focus Microwaves (Dollard-des-Ormeaux, Quebec, Canada), the noise behavior of a transistor is fully described by the minimum noise figure ($NF_{min}$), equivalent noise resistance ($R_n$), real and imaginary part of optimum noise source impedance ($Y_{opt}=G_{opt}+j_{Bopt}$). The noise figure only depends on the source impedance ($Z_s=1/Y_s$) seen by the device. Between the four noise parameters exist a simple relation, $$\text{Noise Figure } NF(Y_s)=NF_{min}+(R_n/G_s)*|Y_s-Y_{opt}|^2,$$

where $Y_s=G_s+jB_s$. This is the equation of a set of circles on a Smith Chart (noise circles) for which the value of the noise figure is the level on each circle. (See, http://www.focus-microwaves.com/Products/ProductLinks/noise_sys.html.)

Different types of antennas can be incorporated on-chip. For example, a slot antenna can made by cutting a slot in a discarded section of waveguide and downsized for an on-chip version. In a CommsDesign article, "Wireless transceiver-on-chip now possible", by R. Colin Johnson, Aug. 3, 2004, http://www.commsdesign.com/showArticle.jhtml?articleID=26805541, a spiraling slot was cut into a 1-cm2 metal layer on the top of the chip. By tailoring the antenna's shape, the researchers were able to match the antenna's impedance to the rest of the transceiver without requiring a lossy passive matching network. Such technique could also be used to match for the optimum noise figure.

FIG. 3 represents a GPS receiver embodiment of the present invention, and is referred to herein by the general reference numeral 300. The GPS receiver 300 includes a silicon semiconductor chip 302 on which are integrated a CMOS technology GPS-RF and baseband core 304 and a meander antenna 306. The RF input of the GPS-RF baseband core 304 and meander antenna 306 have impedances in excess of a megohm to reduce the noise that would be generated by the matching network if they were fixed for traditional 50-75 ohm impedances. Only two external components complete the receiver, e.g., a bandpass SAW-filter 308 and a reference oscillator 310. Such GPS receiver 300 is a battery operated portable, and therefore very sensitive to the operating power demands of its active circuits.

FIG. 4 represents a GPS receiver embodiment of the present invention, and is referred to herein by the general reference numeral 400. The GPS receiver 400 includes an application specific integrated circuit (ASIC) package lid 402 which encloses a CMOS technology GPS-RF and baseband core (RF/BB) 404 and a meander antenna 406. Such antenna can be fabricated using thick film and thin film techniques on ceramic or silicon. The RF input of the GPS-RF baseband core 404 and meander antenna 406 have impedances in excess of a megohm to reduce the noise that would be generated by the matching network if they were otherwise fixed for traditional 50-75 ohm impedances. The GPS receiver is completed with a bandpass SAW-filter 408 and a reference oscillator 410.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the scope of the invention.

What is claimed is:

1. A GPS receiver, comprising:
a radio frequency (RF) stage implemented with CMOS technology on a silicon semiconductor chip;
an on-chip antenna disposed on said silicon semiconductor chip and connected to provide GPS signal transmissions to the RF stage; and
a lossless matching network providing for an optimum noise figure match between the on-chip antenna and the RF stage;
wherein, a match between the on-chip antenna and the RF stage is not a best impedance match for maximum power transfer, but instead a match for a best noise-figure.

2. The GPS receiver of claim 1, further comprising:
a baseband GPS digital signal processor stage connected to the RF stage and implemented to share said silicon semiconductor chip and said CMOS technology;
wherein, both the GPS digital signal processor and RF stages are operated at the same core voltages to eliminate any need for level shifters that would otherwise consume battery operating power.

3. The GPS receiver of claim 1, wherein:
an input of the RF stage and on-chip antenna have impedances in excess of a megohm to reduce the noise that would be generated by the lossless matching network if they were fixed for traditional 50-75 ohm impedances.

4. A method for reducing power consumption in a portable radio receiver, comprising:
implementing a baseband digital signal processor and an RF stage in CMOS technology and operating them at the same core voltages to eliminate any level shifters that would otherwise consume battery operating power; and
matching an antenna to an input of said RF stage for optimum noise figure independent of best impedance matching.

5. The method of claim 4, further comprising:
disposing said antenna on-chip with both said baseband digital signal processor and said RF stage.

6. The method of claim 4, further comprising:
tapping said antenna at a high impedance point to match an input impedance of said RF stage that is in excess of a megohm.

7. A GPS receiver, comprising:
a radio frequency (RF) stage implemented with CMOS technology on a silicon semiconductor chip;
an ASIC-lid antenna disposed on a lid of an application specific integrated circuit (ASIC) that includes said silicon semiconductor chip and that is connected to provide GPS signal transmissions to the RF stage; and
a lossless matching network providing for an optimum noise figure match between the on-chip antenna and the RF stage.

8. The GPS receiver of claim 7, further comprising:
a baseband GPS digital signal processor stage connected to the RF stage and implemented to share said silicon semiconductor chip and said CMOS technology;
wherein, both the GPS digital signal processor and RF stages are operated at the same core voltages to eliminate any need for level shifters that would otherwise consume battery operating power.

9. The GPS receiver of claim 7, wherein:
an input of the RF stage and ASIC lid antenna have impedances in excess of a megohm to reduce the noise that would be generated by the lossless matching network if they were fixed for traditional 50-75 ohm impedances.

10. A method for reducing power consumption in a portable radio receiver, comprising:

implementing a baseband digital signal processor and an RF stage in CMOS technology and operating them at the same core voltages to eliminate any need for level shifters that would otherwise consume battery operating power;

disposing said antenna on a lid of an application specific integrated circuit (ASIC) that includes said both said baseband digital signal processor and said RF stage; and matching an antenna to an input of said RF stage for optimum noise figure independent of best impedance matching.

11. The method of claim 10, further comprising:

tapping said antenna at a high impedance point to match an input impedance of said RF stage that is in excess of a megohm.

* * * * *